United States Patent
Stiesdal

(10) Patent No.: US 8,710,720 B2
(45) Date of Patent: Apr. 29, 2014

(54) GENERATOR WITH A SEGMENTED STATOR

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 342 days.

(21) Appl. No.: 13/091,280

(22) Filed: Apr. 21, 2011

(65) Prior Publication Data

US 2011/0272950 A1 Nov. 10, 2011

(30) Foreign Application Priority Data

May 5, 2010 (EP) .................................... 10161945

(51) Int. Cl.
*H02K 1/18* (2006.01)
(52) U.S. Cl.
USPC .................................. 310/432; 310/216.113
(58) Field of Classification Search
USPC ............................ 310/432, 216.113–216.137
See application file for complete search history.

(56) References Cited

U.S. PATENT DOCUMENTS

| | | | | |
|---|---|---|---|---|
| 1,422,414 | A | * | 7/1922 | Burke ........................... 310/421 |
| 3,586,942 | A | * | 6/1971 | McMahan ................ 318/400.41 |
| 4,491,769 | A | * | 1/1985 | Heidelberg .............. 318/400.41 |
| 7,723,888 | B2 | * | 5/2010 | Petek ....................... 310/156.35 |
| 2008/0169720 | A1 | * | 7/2008 | Petek ....................... 310/156.35 |
| 2010/0072854 | A1 | * | 3/2010 | Stiesdal ................. 310/216.113 |
| 2011/0156526 | A1 | * | 6/2011 | Lau et al. ............... 310/216.129 |
| 2011/0227446 | A1 | * | 9/2011 | Vedy ...................... 310/216.118 |

FOREIGN PATENT DOCUMENTS

| | | |
|---|---|---|
| DE | 102005042543 A1 | 3/2007 |
| EP | 0094978 A1 | 11/1983 |
| EP | 2063116 A1 | 5/2009 |

* cited by examiner

*Primary Examiner* — Thanh Lam

(57) ABSTRACT

A generator, a stator segment and a wind turbine are provided. The generator has a rotor and a stator. The stator includes stator segments attached to a circular holding structure. A stator segment has at least one first connection element being in engagement with at least one second connection element of the holding structure. The engagement is detachable in an axial direction and not detachable in a radial and a circumferential direction.

15 Claims, 3 Drawing Sheets

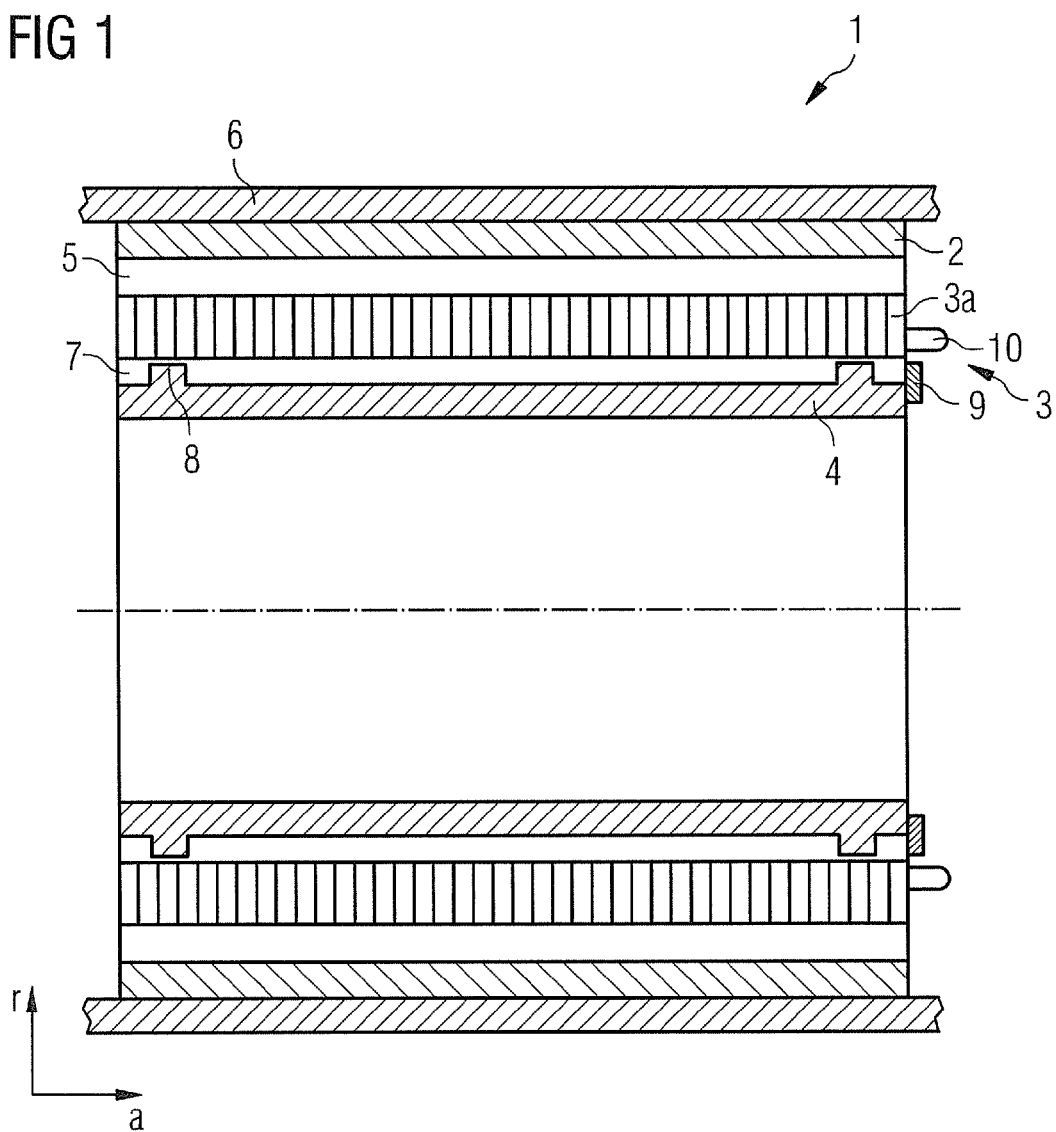

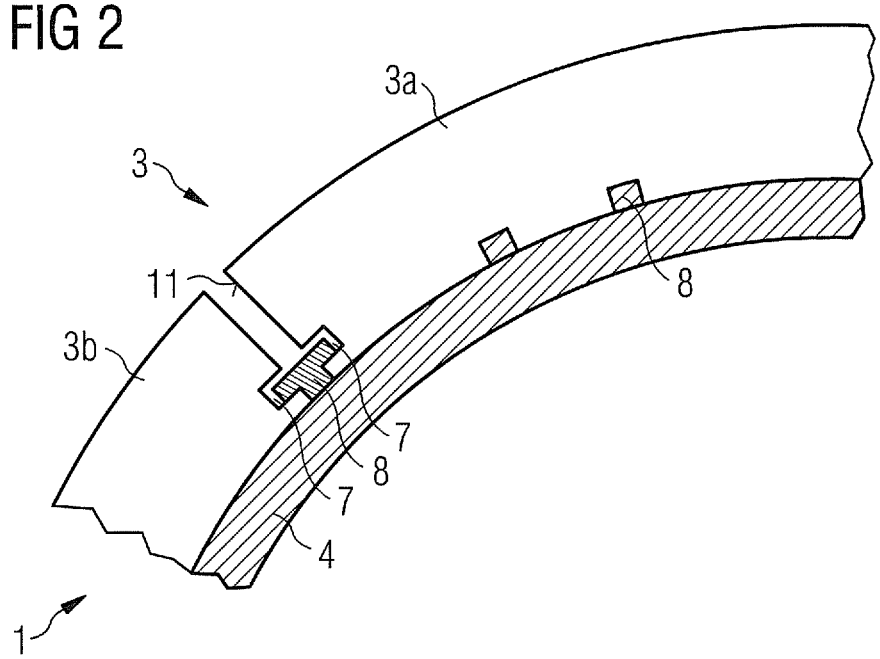
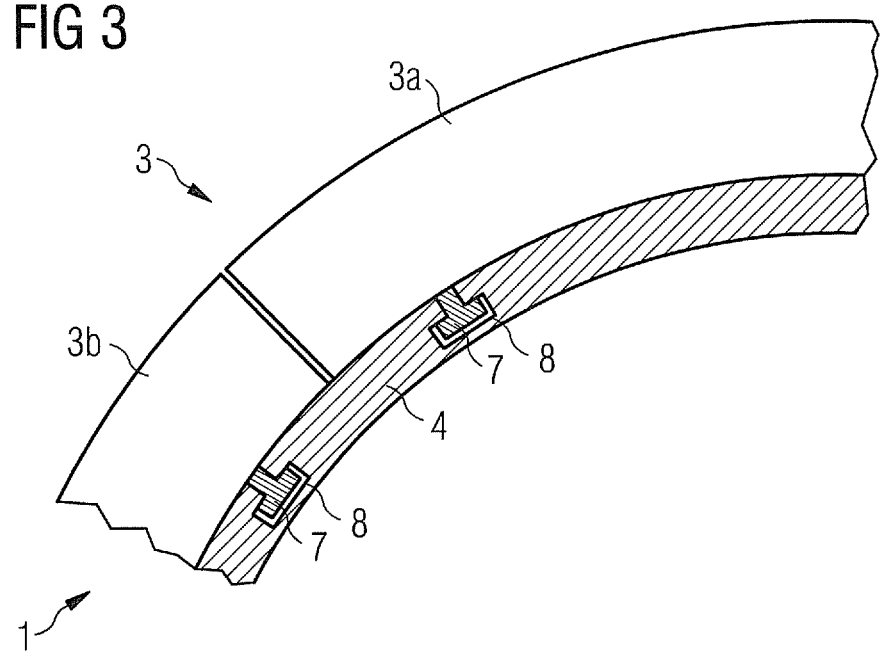

GENERATOR WITH A SEGMENTED STATOR

CROSS REFERENCE TO RELATED APPLICATIONS

This application claims priority of European Patent Office Application No. 10161945.0 EP filed May 5, 2010, which is incorporated by reference herein in its entirety.

FIELD OF INVENTION

The present invention relates in general to a generator with a segmented stator. In particular, the present invention is directed to the mounting and dismantling of a generator, especially a generator of a wind turbine.

BACKGROUND OF INVENTION

Generators generally have a moving rotor and a stationary stator to generate electrical energy. It is known to divide the stator into segments. This allows for easy maintenance and replacement of the stator as single segments can be mounted and dismantled separately.

These segmented stators however, are known for generators with an outer stator and an inner rotor. In this configuration the stator segments are mounted or dismantled in radial direction outward from the generator.

Recently, generators with an outer rotor and an inner stator got more common. In this configuration the rotor has to be dismantled before the stator segments can be mounted or dismantled radially.

SUMMARY OF INVENTION

It is an object of the present invention to improve the handling of a generator with a segmented stator.

This object is achieved with a generator, a stator segment and a wind turbine as claimed in the independent claims. The dependent claims offer further details and advantages of the invention.

In one aspect the invention is directed to a generator with a rotor, which may be, in particular, an outer rotor, and a stator, which may be, in particular, an inner stator, wherein the stator has stator segments attached to a circular holding structure. The stator segment has at least one first connection element being in engagement with at least one second connection element of the holding structure. The engagement is detachable in axial direction and not detachable in radial and circumferential direction. This generator can be easily mounted and dismantled as the stator can be handled without movement of the rotor. This allows for replacement of a broken stator segment without the need for a crane to lift down the complete generator. Also, one or more stator segments can be removed temporarily to get access to the rotor for service or maintenance of rotor elements. During production of the generator time is saved due to easy mounting and aligning of the stator segments.

The first connection element may be arranged at an inner circumferential surface and/or at a radial surface. This arrangement guarantees a good connection between the holding structure and the stator segment while being easy to implement at the same time.

The first connection element may have a projection and the second connection element may have a corresponding recess. Alternatively, the first connection element may have a recess and the second connection element may have a corresponding projection. The connection elements or more specifically the recesses and projections may reach along the complete axial length of the stator segment and the holding structure, respectively. However, they can also cover only part of the axial length. These configurations all allow for a good radial and circumferential hold and for an easy axial movement of the stator segments. Instead of separately defined projections and recesses the first and second connection elements can have the form of two continuous contours which are complementary to each other for engagement.

One first or second connection element may be in engagement with two second or first connection elements. These two connection elements can be arranged at one or two stator segments. With this implementation the number of connection elements can be reduced thereby facilitating production of the generator.

The generator may have an axial locking mechanism holding the stator segment releasable in an axial position. The locking mechanism can be formed integrally with the connection elements as for example a latching or snap mechanism. A separate mechanism can also be utilized. The locking mechanism may secure one, several or all stator segments against unwanted axial release.

The axial locking mechanism may be arranged at a face side of the stator segment and/or the holding structure. At this position the locking mechanism can be opened easily.

The stator segment may have a support structure and the support structure may comprise the first connection element. The support structure can be used to strengthen the structure of the stator segments. The support structure can further be utilized to adapt the stator segment with a bigger diameter to a holding structure with a smaller diameter. The support structure may support more than one stator segments. In this case however, it may only be possible to mount and dismantle the stator segments of the support structure together.

The first connection element may have a first mounting structure and a second mounting structure spaced apart from each other in axial direction, wherein the first mounting structure may have a smaller radial extension than the second mounting structure. The second connection element may have a first mounting base and a second mounting base spaced apart from each other in axial direction, wherein the first mounting base may have a larger radial extension than the second mounting base. This arrangement gives stable support for the stator segments for example for generators with a certain axial length.

In a second aspect the invention is directed to a stator segment for a generator as described above. Stator segments compatible to the generator can be used for replacement of broken stators or for later retro-fitting.

In a further aspect the invention is directed to a wind turbine with a tower and a main shaft connected to the tower. A blade hub is rotatively connected via a main bearing to the main shaft and blades are connected to the blade hub. The wind turbine has a generator as described above. The easy maintenance of the generator is especially helpful for wind turbine generators as they sit on top of a high tower which can have a length of hundred meters and more.

The wind turbine may have the stator, which may be, in particular, an inner stator, attached to the main shaft and may have the rotor, which may be, in particular, an outer rotor, attached to the blade hub. In particular for a wind turbine with inner stator/outer rotor arrangement the generator is beneficial as the construction principles of the wind turbine and the generator match to each other.

The accompanying drawings are included to provide a further understanding of embodiments. Other embodiments and many of the intended advantages will be readily appreciated as they become better understood by reference to the following detailed description. The elements of the drawings do not necessarily scale to each other. Like reference numbers designate corresponding similar parts.

BRIEF DESCRIPTION OF THE DRAWINGS

FIG. 1 illustrates a schematic cross-sectional view of a generator with a segmented stator.

FIG. 2 illustrates an axial view of a generator with a stator segment.

FIG. 3 illustrates an axial view of another generator with a stator segment.

DETAILED DESCRIPTION OF INVENTION

Figure 4:
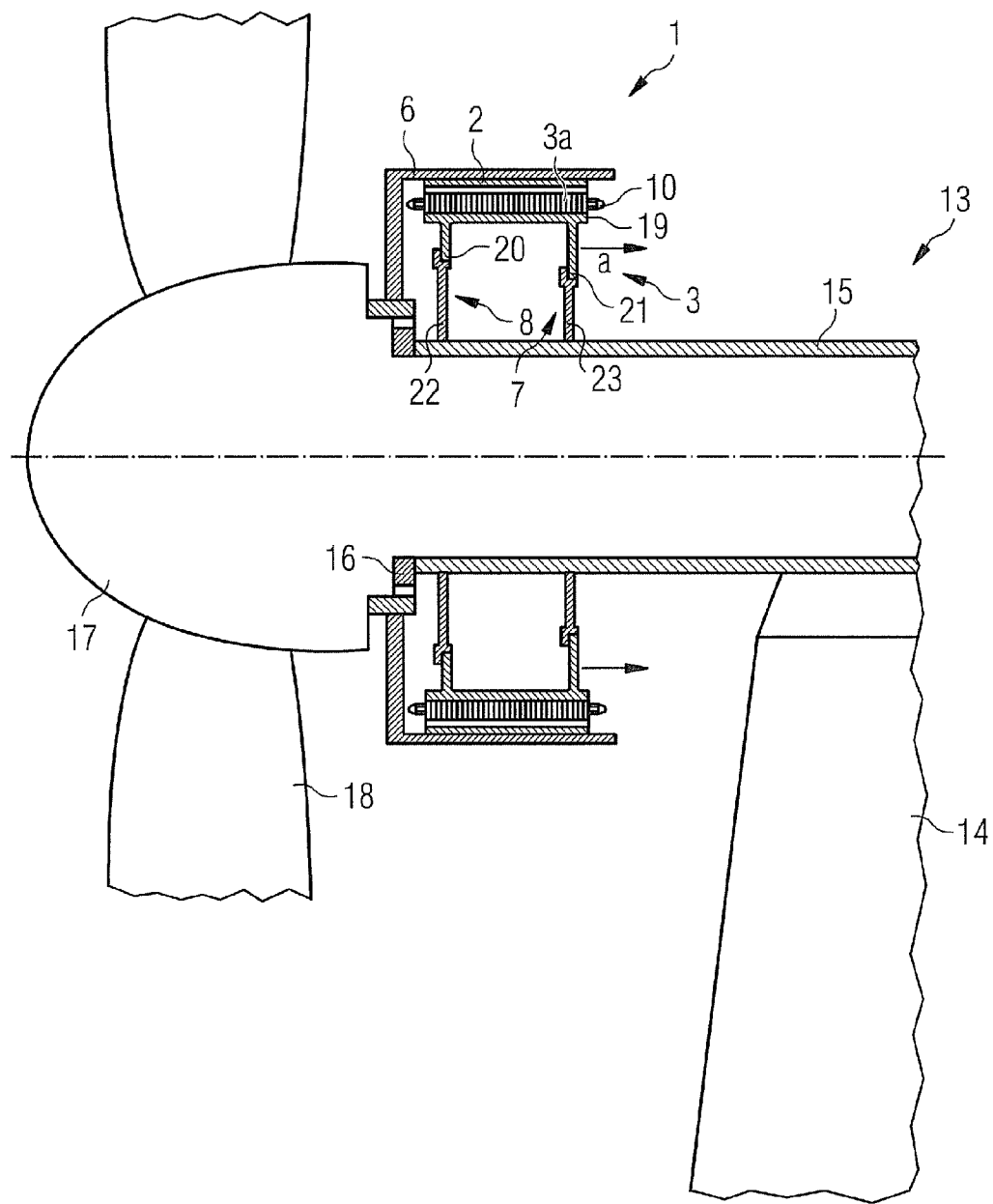
FIG. 4 illustrates a schematic view of a wind turbine with a generator with a segmented stator.

In the following detailed description, reference is made to the accompanying drawings which form a part hereof and in which are shown by way of illustration specific embodiments in which the invention may be practised. In this regard, directional terminology, such as "top" or "bottom" etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIG. 1 shows a generator 1 with an outer rotor 2 and an inner stator 3. The outer rotor 2 has armature windings while the inner stator 3 has permanent or electromagnets. Alternatively, the armature windings are arranged at the inner stator 3 and the magnets are arranged at the outer rotor 2.

The inner stator 3 is divided into several stator segments which is discussed later in conjunction with FIGS. 2 and 3. In FIG. 1, one stator segment 3a is depicted. The inner stator 3 is attached to a circular holding structure 4. One or more circular holding structures 4 can be employed. A holding structure 4 having the shape of a tube can also be utilized. The holding structure 4 can be mounted to a further base part like a main shaft of a wind turbine for example or can be formed integrally with this base part.

The inner stator 3 is surrounded by the outer rotor 2. A small air gap 5 separates stator 3 and rotor 2. The rotor 2 is attached to a rotating part 6 of the structure. The rotating part can be attached or part of a blade hub of a wind turbine for example.

The inner stator 3 or stator segment 3a has a first connection element 7. A second connection element 8 of the holding structure 4 is in engagement with the first connection element 7. The connection elements 7 and 8 define a connection between the stator segment 3a and the holding structure 4. The connection is detachable in axial direction a and not detachable in radial direction r and in circumferential direction (normal to r and a).

The first connection element 7 has here the form of an axial recess reaching over the complete axial length of the stator segment 3a. The second connection element 8 has here the form of two corresponding projections. The projections are in engagement with the recess allowing movement of the stator segment 3a in axial direction a in order to mount or remove the stator segment 3a. FIG. 1 shows connection elements reaching over the complete length of the generator 1. It is also possible that one or both connection elements cover only part of the length of the generator. Instead of two projections one or more projections can be used.

A locking mechanism 9 secures the stator segment against accidental axial movement. The locking mechanism 9 can be implemented as a latch, ratchet or any other suitable mechanism. It is also possible to faun the locking mechanism integrally with one or both of the connection elements. The locking mechanism is arranged at a face side of the stator segment 3a and of the holding structure 4. A hook 10 is attached to a face side of the stator segment 3a for easy release of the stator segment 3a.

FIG. 2 shows a partial front view of the generator 1. The holding structure 4 and two stator segments 3a and 3b are depicted. The stator segments 3a and 3b have a first connection element 7 in form of a recess arranged at a radial surface 11 of the segment. The first connection element 7 continues in axial direction along the radial surface 11.

The holding structure 4 has a second connection element 8 in the form of a T-shaped projection. One side of the second connection element 8 is in engagement with the stator segment 3a and a second side of the second connection element is in engagement with the stator segment 3b. The stator segments 3a and 3b are fixed in radial and circumferential direction and can be released in axial direction.

The holding structure 4 has two further optional connection elements 8 in form of a projection. These two projections engage into corresponding recesses of the stator segment 3a. Stator segment 3b can have the same or similar recesses. The projections can support the T-shaped projection 8 in holding the stator segment 3a especially at high revolutions of the generator 1. The projections can also act as an insertion guide for mounting the stator segment 3a.

A gap is shown between the two stator segments 3a and 3b. Depending on the design and use of the generator the stator segments 3a and 3b and/or the connection elements 7 and 8 can be formed that no or a very small gap between two stator segments is existent.

FIG. 2 shows the holding structure 4 with the second connection elements 8 in form of projections and the stator segments 3a and 3b with the first connection elements 7 in form of recesses. However, the holding structure 4 can both comprise a recess and a projection and the stator segments 3a, 3b can comprise a corresponding projection and recess.

Instead of separately defined projections and recesses the first and second connection elements can have the form of two continuous contours which are complementary to each other for engagement.

FIG. 3 shows part of the generator 1 with a stator 3 having two stator segments 3a, 3b and a holding structure 4 similar to the ones shown in FIG. 2. Here, the first connection elements 7 are T-shaped projections arranged at an inner circumferential surface 12. Each stator segment 3a, 3b has two first connection elements arranged in the vicinity of ends of the stator segment.

The holding structure 4 has second connection elements 8 in a corresponding T-shape form to accommodate the first connection elements 7. The connection elements 7, 8 hold the stator segments in radial and circumferential direction while allowing an axial mounting and removal of the stator segment 3a, 3b. Instead of T-shaped connection elements 7, 8 any other suitable form can be used which prevents radial and circumferential separation of the stator segment from the holding structure 4 while still allowing for an axial movement.

FIG. 4 shows a wind turbine 13 with a tower 14 and a main shaft 15 fixed on top of the tower 13. A main bearing 16 connects the main shaft 15 and a blade hub 17 rotatively. Two or more blades 18 are fixed to the blade hub 17.

A generator 1 with an outer rotor 2 and an inner stator 3 is integrated into the wind turbine 13. The outer rotor 2 is fixed to a rotating part 6 which is attached to or part of the blade hub 17. The inner stator 3 has stator segments of which one stator segment 3a is depicted.

The stator segment 3a has a support structure 19 with the first connection element 7. The first connection element has a first mounting structure 20 and a second mounting structure 21 which are spaced apart from each other in axial direction a. The first mounting structure 20 has a smaller radial extension than the second mounting structure 21. The mounting structures 20, 21 can consist of flanges e.g. in the faun of segments of a circle or they can be implemented as bars.

The second connection element 8 is attached to the main shaft 15 and has a first mounting base 22 and a second mounting base 23 spaced apart from each other in axial direction a. The first mounting base 22 has a larger radial extension than the second mounting base 23. The mounting bases 22, 23 can consist of flanges e.g. in the form of segments of a circle or they can be implemented as bars.

The first mounting structure 20 engages with the first mounting base 22 and the second mounting structure 21 engages with the second mounting base 23 to fix the stator segment 3a in radial and circumferential direction while allowing mounting and removal of the stator segment 3a in axial direction a. The connections between the mounting bases 22, 23 and the mounting structures 21, 23 can be achieved by the connections shown in FIGS. 2 and 3 for example. Any other suitable connection means can be used as long as they guarantee the needed characteristics.

The radial extension of the mounting structures 21, 23 and/or the mounting bases 22, 23 is adapted to place rotor 2 and stator 3 closely together. The radial extension depends on the structural situation of the device, here the wind turbine 13.

The assembling and disassembling of the stator segment 3a will be described. After the tower 14 with the main shaft 15 is set up the blade hub 17 can be put in place. During this process the mounting bases 22, 23 and the outer rotor 2 are set up. In a next step the stator segments 3a are put in position. They are slidingly inserted with their first connection elements 7 or their mounting structures 21, 23 into the second connection elements 8 or the mounting bases 22, 23. Once in place they can be fixed with a locking mechanism. A nacelle is usually put around generator 1 and the main shaft 15 to protect the inner parts of the wind turbine 13.

In order to dismantle a stator segment 3a a locking mechanism is opened (if present) and the stator segment 3a is gripped at the hook 10. Then the stator segment 3a is pulled out of the engagement with the second connection element 8 in axial direction a. This can be done easily even at a height of a wind turbine 13. No crane is necessary to dismount the complete generator 1. The replacement stator segment can then be inserted into the empty position of the stator 3.

The invention claimed is:

1. Generator, comprising:
   a rotor;
   a stator comprising stator segments, at least one of the stator segments comprising a first connection element; and
   a circular holding structure comprising a second connection element,
   wherein the at least on stator segment is attached to the holding structure via an engagement between the first and second connection elements,
   wherein the engagement is configured such that the at least one stator segment is detachable in an axial direction but not detachable in a radial direction and not detachable in a circumferential direction, and
   wherein one of the connection elements comprises a T-shaped projection and the other connection element comprises a mating recess for the engagement of the T-shaped projection.

2. Generator according to claim 1, wherein the rotor is an outer rotor and the stator is an inner stator.

3. Generator according to claim 1, wherein the first connection element is arranged at an inner circumferential surface.

4. Generator according to claim 1, wherein the first connection element is arranged at a radial surface.

5. Generator according to claim 1, wherein the first connection element comprises T-shaped projection and the second connection element comprises a corresponding recess.

6. Generator according to claim 5, wherein the first connection element is attached to the at least one of the stator segments.

7. Generator according to claim 1, wherein the first connection element comprises the recess and the second connection element comprises the corresponding T-shaped projection.

8. Generator according to claim 7, wherein second connection element is attached to the circular holding structure.

9. Generator according to claim 1, wherein the first or the second connection element is in engagement with two second or first connection elements.

10. Generator according to claim 1, wherein the generator further comprises an axial locking mechanism preventing the at least one stator segment from being releasable in an axial position.

11. Generator according to claim 10, wherein the axial locking mechanism is arranged at a face side of the at least one stator segment and/or the holding structure.

12. Generator according to claim 1, wherein the at least one stator segment comprises a support structure, and wherein the support structure comprises the first connection element.

13. Generator according to claim 12, wherein
   the first connection element comprises a first mounting structure and a second mounting structure spaced apart from each other in axial direction,
   the first mounting structure has a smaller radial extension than the second mounting structure,
   the second connection element comprises a first mounting base and a second mounting base spaced apart from each other in axial direction, and
   the first mounting base comprises a larger radial extension than the second mounting base.

14. Wind turbine, comprising:
   a tower;
   a main shaft connected to the tower;
   a blade hub rotatively connected via a main bearing to the main shaft; and
   blades connected to the blade hub, the blade hub comprising a generator as claimed in claim 1.

15. Wind turbine according to claim 14, wherein the stator is attached to the main shaft and wherein the rotor is attached to the blade hub.

* * * * *